United States Patent [19]

Montano et al.

[11] Patent Number: 5,017,399
[45] Date of Patent: May 21, 1991

[54] APPARATUS FOR SUB-DIVIDING HAY BALES

[76] Inventors: Donald Montano, 193 Alpine Dr.;
Ernest Montano, 230 W. 19th,
Apartment D, both of Merced, Calif.
95340

[21] Appl. No.: 462,639

[22] Filed: Jan. 9, 1990

Related U.S. Application Data

[62] Division of Ser. No. 217,622, Jul. 11, 1988, Pat. No. 4,909,139.

[51] Int. Cl.$^5$ ................................................. A23K 1/00
[52] U.S. Cl. ..................................... 426/636; 426/518;
426/807; 83/929; 241/101 A
[58] Field of Search ............... 426/636, 518, 807, 414;
83/404, 404.2, 23, 39, 404.3, 929; 241/101 A

[56] References Cited

U.S. PATENT DOCUMENTS

| | | | |
|---|---|---|---|
| 3,183,858 | 5/1965 | Lawrence | 426/518 |
| 3,492,132 | 1/1970 | Partyka | 426/518 |
| 3,830,438 | 8/1974 | Garrison | 83/23 |
| 4,163,524 | 8/1979 | Lundahl et al. | 83/23 |
| 4,771,670 | 9/1988 | Woerman | 83/23 |

Primary Examiner—R. B. Penland
Attorney, Agent, or Firm—Owen, Wickersham & Erickson

[57] ABSTRACT

A method for cutting a generally oblong, compressed bale of hay or forage into a plurality of elongated subsections, is disclosed. The method comprises moving compressed bales continuously through a sawing section having a first and second series of saws arranged transversely for progressively cutting the bale at a series of vertical and horizontal planes to form the hay subsections. The cut sub-sections are caused to fall on a conveyor belt which dispenses them from the end of an outlet chute. The sawing of the bale minimizes leaf and fibre damage, and the cut subsections of hay readily break apart to make them easily consumable by livestock.

6 Claims, 5 Drawing Sheets

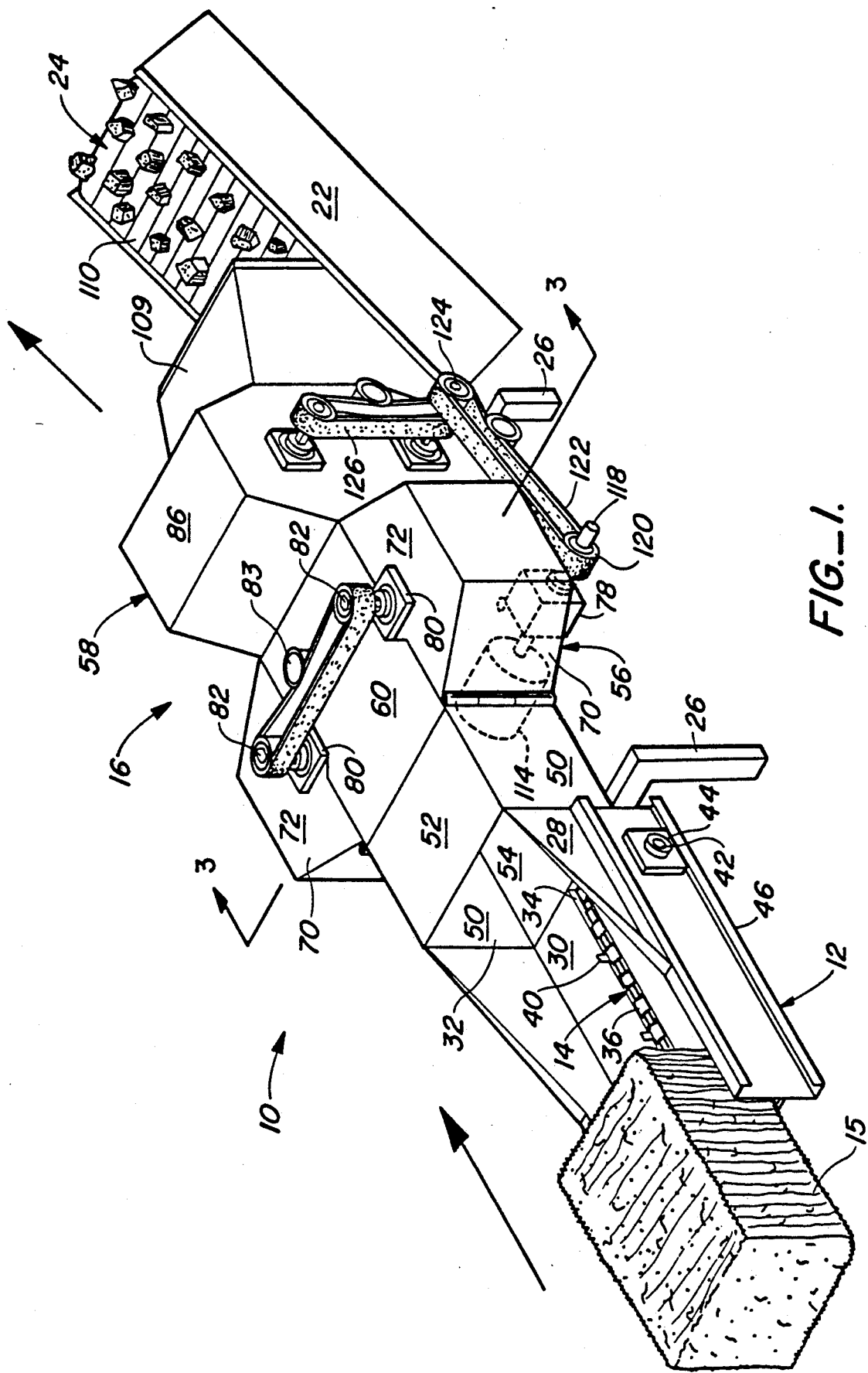
FIG._1.

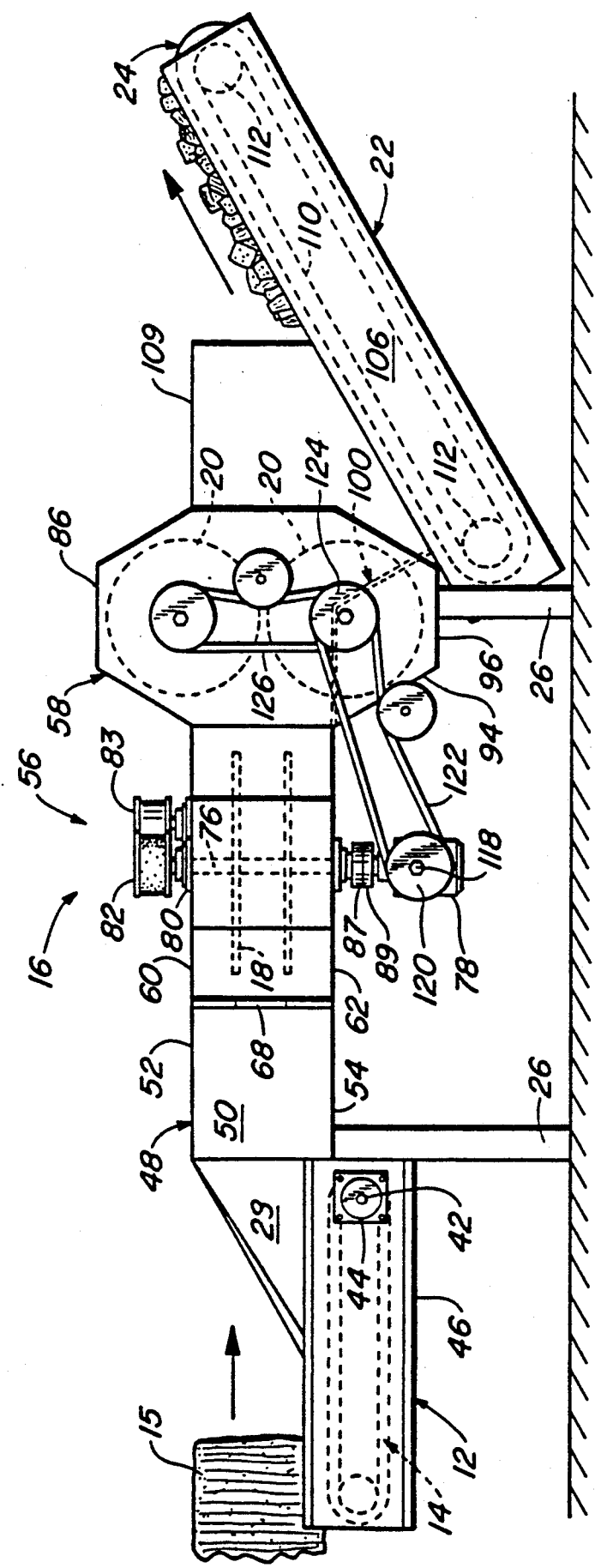
FIG._2.

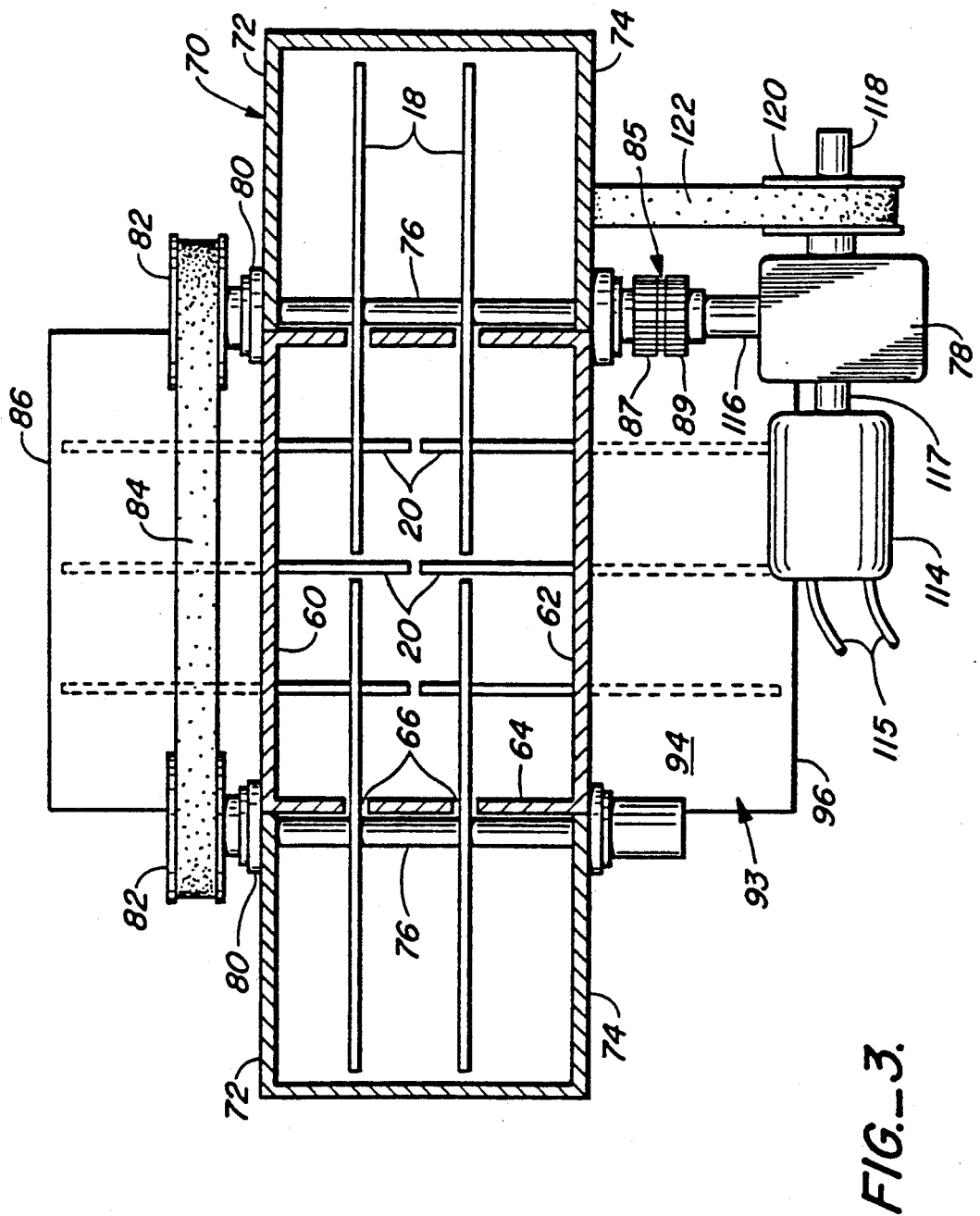
FIG._3.

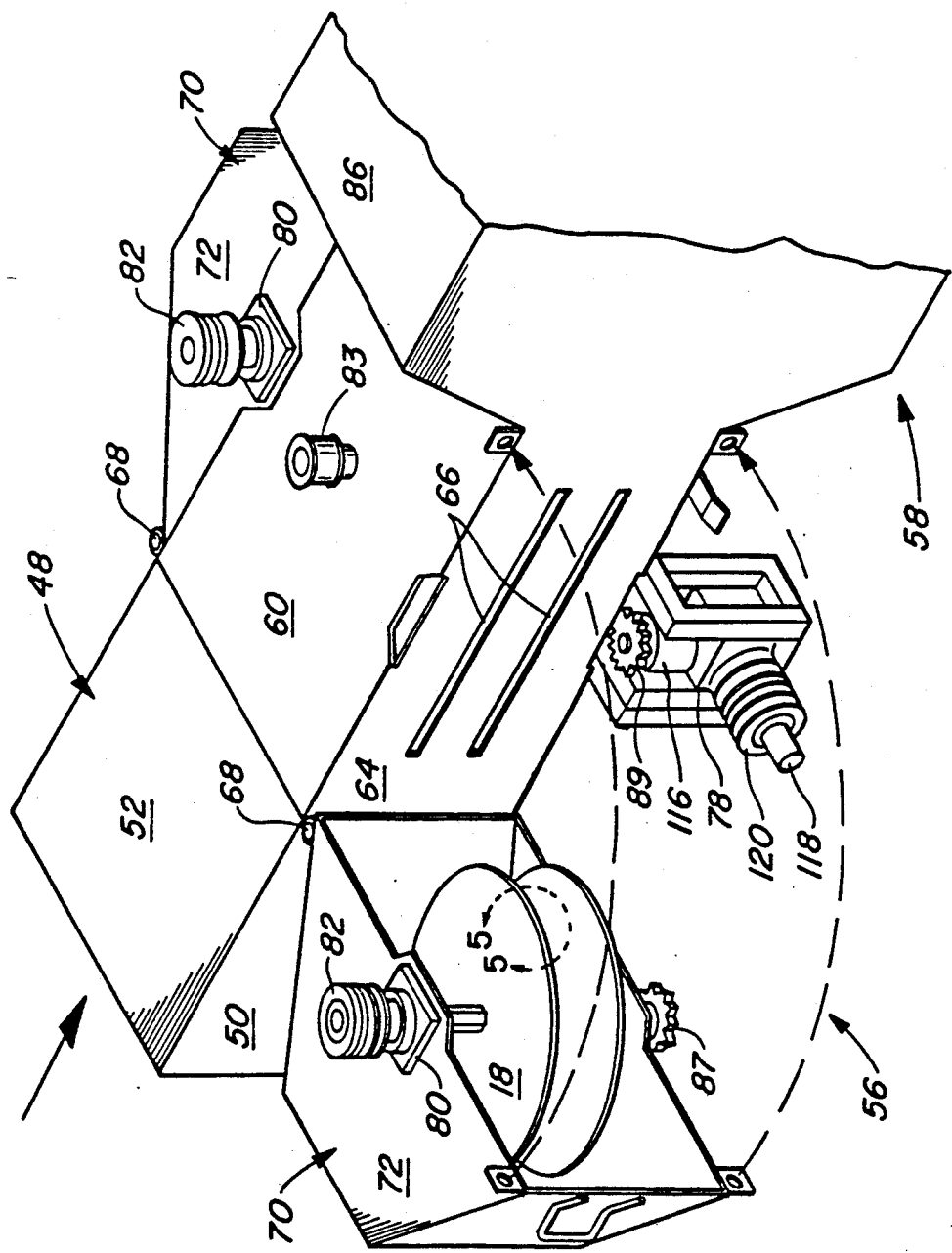
FIG._4.

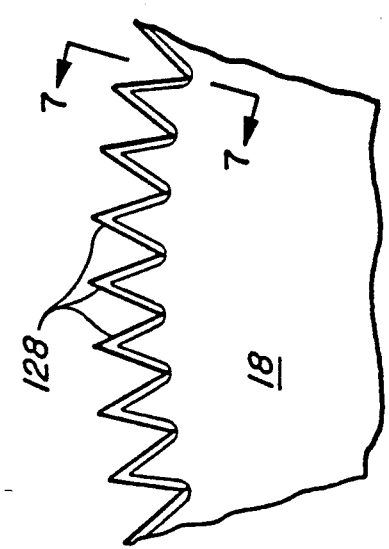
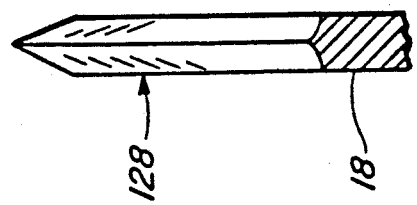
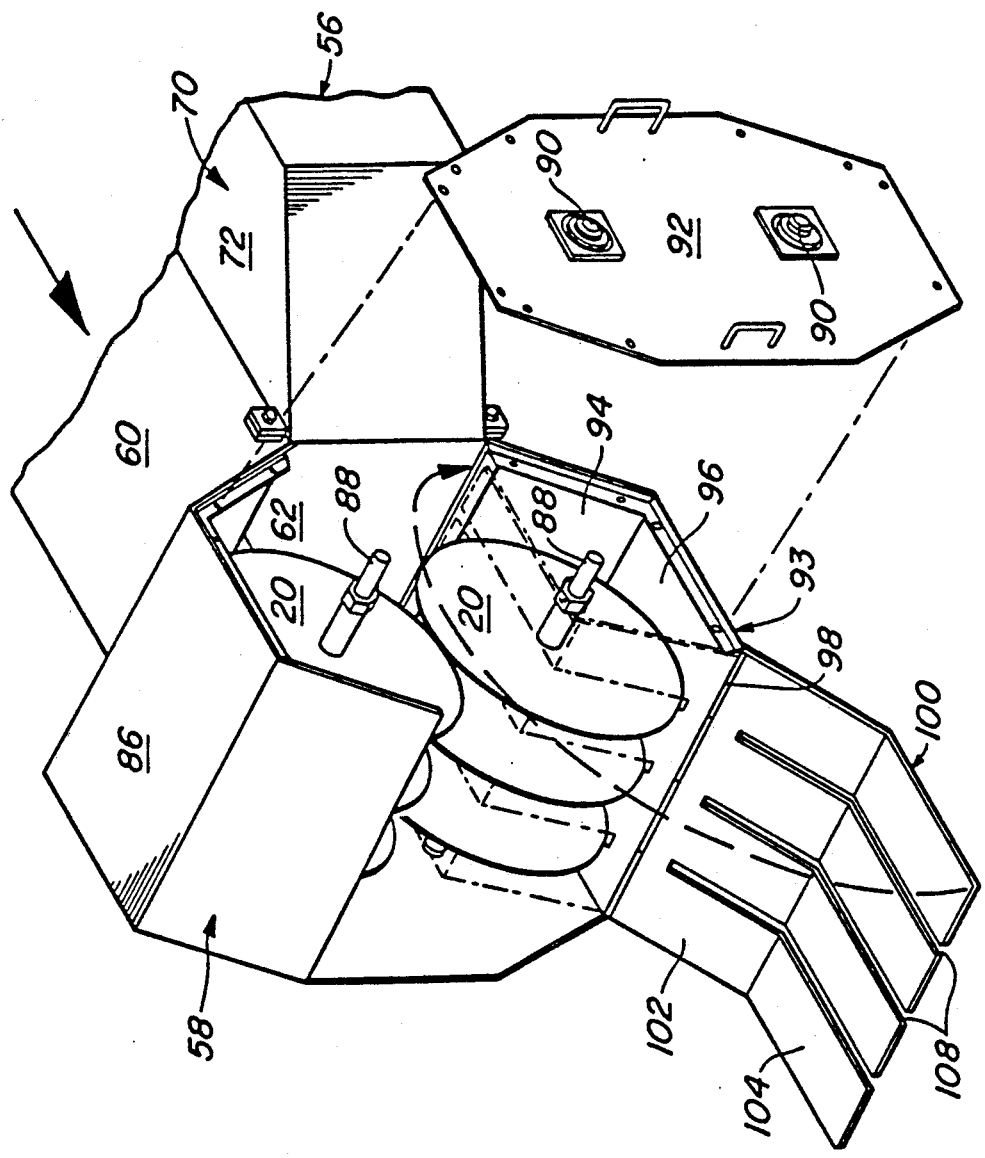

APPARATUS FOR SUB-DIVIDING HAY BALES

REFERENCE TO RELATED APPLICATION

This application is a divisional application of parent application Ser. No. 07/217,622 filed on July 11, 1988, which is now U.S. Pat. No. 4,909,139.

This invention relates to apparatus for preparing livestock feed and more particularly to a machine for sub-dividing bales of forage such as hay into smaller portions for livestock consumption.

BACKGROUND OF THE INVENTION

Livestock such as cattle are fed throughout the year at different locations with a variety of feed of various forms including fodder and forage such as staple grains and hay. In some instances certain feed constituents with supplements are chopped to a relatively small size, mixed and then compressed in pellet form that is more efficiently stored and distributed. Hay or alfalfa, which is a staple livestock forage feed, is usually collected and compressed into dense, tightly packed bales that are generally oblong in shape. In order for the compressed baled hay to be distributed to individual cattle small quantities of hay must be separated from the bale. Where many animals are involved it is overly time consuming to separate by hand a bale of hay. Heretofore, to solve the problem of breaking up hay bales into smaller portions machines have been devised for shredding or grinding the hay bales. However, a serious disadvantage with such prior machines was that they tended to pulverize the hay, destroying the leaf content and destroying a large percentage of the hay.

It is therefore a general object of the invention to provide a method for sub-dividing bales of compressed hay or forage into a plurality of substantially smaller portions that can be readily distributed and devoured by livestock.

Another more specific object of the invention is to provide a machine which will saw a bale of hay in two directions to form a plurality of substantially equal elongated oblong sections which will readily break apart into smaller components without destroying the fibre and leaf content of the hay.

Still another object of the invention is to provide a method that will move a continuous line of spaced apart hay bales through successive banks of moving multiple saws to form a multiplicity of oblong hay components of substantially uniform size.

Another object of the invention is to provide an improved method for sub-dividing a compressed bale of hay into smaller, uniform portions that are more readily consumable by livestock.

Yet another object of the invention is to provide a machine for cutting hay bales into sub sections that is particularly well adapted for ease and economy of manufacture and that is easy to service and maintain.

SUMMARY OF THE INVENTION

In accordance with the principles of the invention a hay apportioning machine is provided which comprises generally a input chute that is slightly wider than a standard bale of compressed hay. A continuous chain belt with spaced apart lugs is provided in the bottom side of the input chute. Ahead of the chain belt within the chute is a first gang of rotary saws that are fixed to cut the hay horizontally into a series of slab sections. Directly ahead of the first gang of saws is a second gang of rotary saws that are oriented to cut the moving bale vertically at spaced apart locations. The two gangs of saws cut the hay bale into a plurality of elongated oblong blocks. From the second gang of rotary saws, the cut bale is forced onto a conveying chain belt in the bottom of a sloped outlet chute. As the sub-divided oblong blocks fall upon the exit conveying belt within the outlet chute, they tend to break apart into smaller portions that are more easily distributed to and eaten by livestock.

Other objects, advantages and features of the invention will become apparent from a detailed description of one embodiment thereof, presented in conjunction with the accompanying drawing.

BRIEF DESCRIPTION OF THE DRAWING

FIG. 1 is a view in perspective of a hay bale cutting machine embodying principles of the present invention.

FIG. 2 is a view in elevation and partially in section of the machine shown in FIG. 1.

FIG. 3 is an end view in section of the machine of FIG. 1, taken along line 3—3 thereof.

FIG. 4 is a fragmentary view in perspective showing a portion of the sawing section including the horizontal rotary saw blades for the machine of FIG. 1.

FIG. 5 is a fragmentary, exploded view in perspective showing a portion of the sawing section with the vertical rotary saw blades for the machine of FIG. 1.

FIG. 6 is a fragmentary view of one saw blade taken at line 6—6 of FIG. 4.

FIG. 7 is a fragmentary view in section taken at line 7—7 of FIG. 6.

DETAILED DESCRIPTION OF EMBODIMENT

With reference to the drawing, FIGS. 1 and 2 show an apparatus 10 for sub-dividing compressed bales of hay or the like in accordance with the principles of the present invention. In broad terms, the apparatus comprises an input chute 12 with drive means 14 for moving hay bales 15 forwardly in a linear path. This input chute is connected to a sawing chamber 16 which includes a first assembly of circular saws 18 positioned for cutting horizontally and mounted in line with the linear path of the incoming bales. Spaced therefrom is a second assembly of circular saws 20 which are positioned to cut the moving bales at spaced apart vertical intervals as they move further along the linear path. As a cut bale emerges from the second saw series, its sub-divided elongated oblong portions fall by gravity onto a connected outlet chute 22 having a bottom conveyor means 24 that moves the smaller hay portions to its outlet end.

The present invention is particularly adaptable for cutting or sub-dividing bales of hay or forage that are generally oblong in shape and are formed by progressively compressing quantities of loose hay in successive layers using end to end pressure in the baler. Such a method normally provides the bale with a natural transverse grain with each quantity of loose hay forming a layer or flake of compressed hay in the bale. When the bale is used, these flakes can be more readily separated along their transverse grain and this bale characteristic may be utilized in the present invention. That is, the bales are preferably first cut horizontally along planes perpendicular to the transverse flake planes, and then vertically but also perpendicular to the transverse flake planes. These two cutting steps thus sub-divide the bale into a series of oblong blocks or sub-portions and within each one of them the flake layers are transverse to the longitudinal dimension of the subdivided block. This enables sub-portions of each block to break apart even further into smaller portions by minimal force such as by falling on the outlet conveyor. The end product is thus a relatively small portion of the hay bale which has been sub-divided therefrom without damaging leaf and fibre content so as to make it readily consumable and highly nutritional for livestock. Typical oblong hay bales have dimensions of approximately 23 inches wide, 16 inches high and 42 inches long. When subdivided in accordance with the illustrated embodiment of the present invention, the elongated cut blocks of hay bales 3 may have a cross-sectional dimension of approximately 5⅛ inches by 5¾ inches with the same length, and then these sub-divided blocks will readily break apart along flake layers to form even smaller portions that are more easily managed by feeding livestock. The aforesaid dimensions are not meant to be limiting and are presented by way of example. Other sized bales could be cut into smaller or longer blocks depending on the number of saw blades used, in accordance with the invention.

Describing now the apparatus 10 in greater detail, as shown in FIGS. 1–5, it is seen that the sawing chamber 16 is mounted above ground level on a pair of supports 26. The input chute 12 has a pair of spaced apart side walls 28 connected to a bottom floor portion 30 that extends to and connects with an opening 32 into the sawing chamber 16. A slot 34 is provided in the floor portion 30 and extends axially along its center line to accommodate the drive means 14 for moving bales through the input chute 12 and into the sawing chamber. The drive means 14 comprises an endless chain 36 supported at opposite ends on a pair of sprockets (not shown), and it extends substantially the full length of the input chute. At spaced intervals along the drive chain are upwardly projecting lugs or pegs 40 which are adapted to penetrate into a hay bale 15 and provide a means for temporarily retaining it on the chain as it is drawn over the floor 30 of the input chute. On one end of the drive chain, one sprocket is mounted on a shaft 42 that is journaled in a bearing member 44 mounted on a frame section 46 underneath the floor of the input chute. The shaft 42 is connected to a suitable constant speed drive motor (not shown) which may be hydraulic or electric.

The sawing chamber 16, as shown in FIGS. 1 to 5, provides a continuous guide through passageway for the incoming hay bales which enables them to move progressively through the first and second series of saws 18 and 20 along a straight path with precision. A short inlet section 48 of the sawing chamber is formed by parallel sidewalls 50 connected to top and bottom panels 52 and 54, all preferably made of sheet metal and forming a rectangular cross sectional area large enough to accommodate a standard sized hay bale with ample clearance to facilitate easy movement through the inlet section.

Attached to the inlet section is the sawing chamber 16, comprised of a first section 56 for the first saw assembly 18 which is connected to a second section 58 for the second gang saw assembly 20. As shown in FIGS. 3 and 4, the first sawing section comprises an upper cover member 60 which is a continuation of the top panel 52 for the inlet section 42, a bottom member 62 which is similarly a continuation of the inlet bottom panel member 54 and side wall members 64 that have a series of spaced apart slots 66. Connected by vertical hinge members 68 to the inlet section sidewalls 64 are a pair of semi-hexagonal shaped side housings 70, preferably made of sheet metal. Supported by top and bottom plates 72 and 74 of each side housing is a vertical shaft 76 on which is mounted a plurality of spaced apart circular saw blades 18 comprising the first saw assembly 18. Preferably, each saw blade has a flat sided hole to match a flat sided cross section of the shaft 76 to provide a non-slip connection, and spacers are used between the saw blades on the shaft to position the saw blades properly.

The ends of each shaft 76 are supported within bearings 80 that are attached to the top and bottom members 72 and 74 of each housing 70. The upper ends of the two shafts 76 are provided with pulleys 82 which support a continuous belt 84. An adjustable idler 83 is attached to the top panel 72 and engages the belt 84 to maintain its tight contact with the pulleys. The lower end of one shaft 76 is connected to a right angle gearbox 78 which is part of a main drive system for both horizontal and vertical gang saw assemblies 18 and 20. As shown in FIG. 2, this connection is preferably by means of a continuous chain 85 which fits around a sprocket 87 at the lower end of the shaft and a similar sprocket 89 on a shaft from the gear box 78.

When the machine 10 is in use with the side housings 70 in their closed position, the circular saw blades 18 on both of the shafts 80 extend through the slots 66. Also, they are sized in diameter so that their teeth are only a short distance apart (i.e. 0.5 inches) at the center line of the sawing chamber. Thus, as a hay bale is moved through the inlet section 12 into the horizontal saws 18, the bale is rapidly cut into horizontal slabs of compressed hay of equal thickness. The semi-hexagonal housings 70 remain closed when the apparatus is in use, but when servicing is required such as when saw blades are replaced, each housing 70 with its shaft 76 and supported saws can be pivoted outwardly around the hinge member 68, as shown in FIG. 4, (after removal of the belt 84) to provide access thereto.

The second section 58 of the sawing chamber 16 for the vertically oriented saw assembly 20 is connected directly to the first section 56 and includes a pair of semi-hexagonal housing members 86 that are similar in shape to those on the first or horizontal section.

As shown in FIG. 5, a pair of horizontal shafts 88 are spaced apart just above and below the passageway for hay bales through the sawing chamber, and the ends of these shafts are supported in bearings 90 fixed to a pair of sidewall panels 92 for the second sawing section. Each shaft 88 has a plurality of spaced apart circular saw blades 18 attached to it in the same manner as on the shaft 76 and, like the horizontal saw blades, they are sized so that only a small gap occurs between upper and lower saw blades.

A lower housing 93 of the second sawing section 58 which extends around the lower series of saw blades, has a panel 94 which slopes downwardly at an angle and is connected to a fixed lower horizontal panel 96. At the outer edge of the horizontal panel is a hinge 98 which connects the lower horizontal panel with a moveable internal support member 100 that is normally positioned to support a moving bale as it moves through the lower vertical saws when the machine is in operation.

This latter support member 100 comprises a first panel 102 which is parallel to the fixed panel 94 when in its operative bale-supporting position. This first panel 102 is integral with a second panel 104 which is parallel with the bottom fixed panel 96 and provides an extension of the bale supporting bottom panel 62 of the first or horizontal sawing section 56 when the support member 100 is in its operating position. A series of slots 108 are provided within the panels 102 and 104 which allow the lower vertical saw blades 20 to extend through when the support member 100 is in its operating position.

The sloping first panel 102 of the support member 100 for the vertical sawing section enables the elongated cut portions of the hay bale 15 to fall by gravity onto the outlet chute 22. This outlet chute, as shown in FIGS. 1 and 2, has parallel sidewalls 106, a cover panel 109 and the upwardly sloping endless conveyor belt or chain means 24 that removes the cut hay portions to the exit end of the outlet chute. The conveyor belt may comprise a series of transverse slats supported by a pair of endless chains that extend around a pair of sprockets 112 at each and. A drive sprocket at one end of the drive chain is attached to a shaft which is connected to a suitable drive motor (not shown) in a manner similar to the arrangement for the bale moving chain 36 within the inlet chute 12.

The drive system for both the horizontal and vertical gang saws is best shown in FIG. 1. A single rotary power source, such as an electrical motor or a tractor power takeoff is used to drive both sets of saws 18 and 20 at a constant speed. This power source (not shown) turns an input shaft 118 which is connected to the right angle gear box 78. The latter has one output shaft 116 which is connected to one vertical shaft 76 for driving the two sets of horizontal saws 18, since the two vertical shafts 76 are connected by the belt 84 as previously described. Another output shaft 117 from the gear box 78 is connected to a hydraulic pump 114, which supplies hydraulic pressure through outlets 115 connected to separate hydraulic motors (not shown) that drive the input drive chain 36 and the outlet conveyor means 24, respectively. A pulley 120 on the shaft 118 is connected by a belt 122 to a pulley 124 on a lower horizontal shaft 88 for the vertical sawing section. The latter shaft is connected by another belt 126 to the upper shaft 88 for the vertical sawing section 58. Thus, both groups of saws 18 and 20 for both the horizontal and vertical sawing sections are driven from a single power source at the same constant speed.

The circular saw blades 18 and 20 used in the hay cutting apparatus 10, as shown in FIG. 6, may be identical in size and shape and preferably are provided with generally triangular and symmetrically shaped teeth 128 as shown in FIG. 7. It has been found that such a saw configuration will readily cut through hay bales cleanly with precision and consistency without stalling to produce the sub-divided compressed hay components.

Generally, hay bales are formed by compressing stacked layers of loose hay. Thus, there is a natural tendency for such layers to separate in one transverse cross-section of the bales. Accordingly, it is preferable when sawing hay bales in the machine 10, that they be inserted into the inlet chute with the natural stacking layers vertically oriented and transverse to the planes on the two series of cutting saws. When the bale, so oriented is cut by the multiple saws 18 and 20 to form elongated subsections, these sub-sections will readily break apart into smaller feed portions as they fall onto the exit conveyor belt. Moreover, these sub-sections are formed without destroying the leaf or fibre content of the hay.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A method for sub-dividing a generally oblong bale of hay or forage having parallel ends, sides, and a top and bottom, said bale having been formed by compressing successive quantities of loose hay using pressure applied to its opposite ends to form compressed transverse flake layers of hay extending across opposite sides of the bale, said method comprising:
   moving the bale of hay continuously along a path generally parallel with its longitudinal axis;
   cutting the bale along a first series of spaced apart horizontal planes that are parallel to the top and bottom of the bale and extend between opposite sides of the bale;
   cutting the bale along a second series of spaced apart vertical planes that are parallel to the sides and extend between the top and bottom of the bale, thereby forming elongated subsections of the bale; and
   moving said cut subsections while allowing them to fall upon a hard surface so that they will tend to break apart further along at least some of said transverse flake layers.

2. The method as described in claim 1 wherein said cutting steps along said horizontal and vertical planes are accomplished by sawing said bales as they are pushed along a linear path.

3. The method as described in claim 1 wherein the cut subsections of hay or forage are caused to fall upon a moving conveyor means which moves them to a dispensing location.

4. A feed unit for livestock formed by the method of claim 1 comprising:
   an elongated sub-divided portion of a compressed bale of hay or forage which has been cut transverse to flake layers to a predetermined size smaller than opposite ends of the bale by means which does not damage the leaf or fibre constituents of the hay.

5. The livestock feed unit of claim 4 wherein the subdivided portion has been formed by sawing a bale of hay along two different pairs of horizontal and vertical planes which are perpendicular to each other.

6. The livestock feed unit of claim 4 wherein said bale has transverse flake layers of compressed hay and the pairs of sawing planes are all perpendicular to said flake layers.

* * * * *